No. 867,019. PATENTED SEPT. 24, 1907.
S. K. DENNIS & F. W. RICE.
FERTILIZER DISTRIBUTER.
APPLICATION FILED MAR. 22, 1907.
3 SHEETS—SHEET 1.
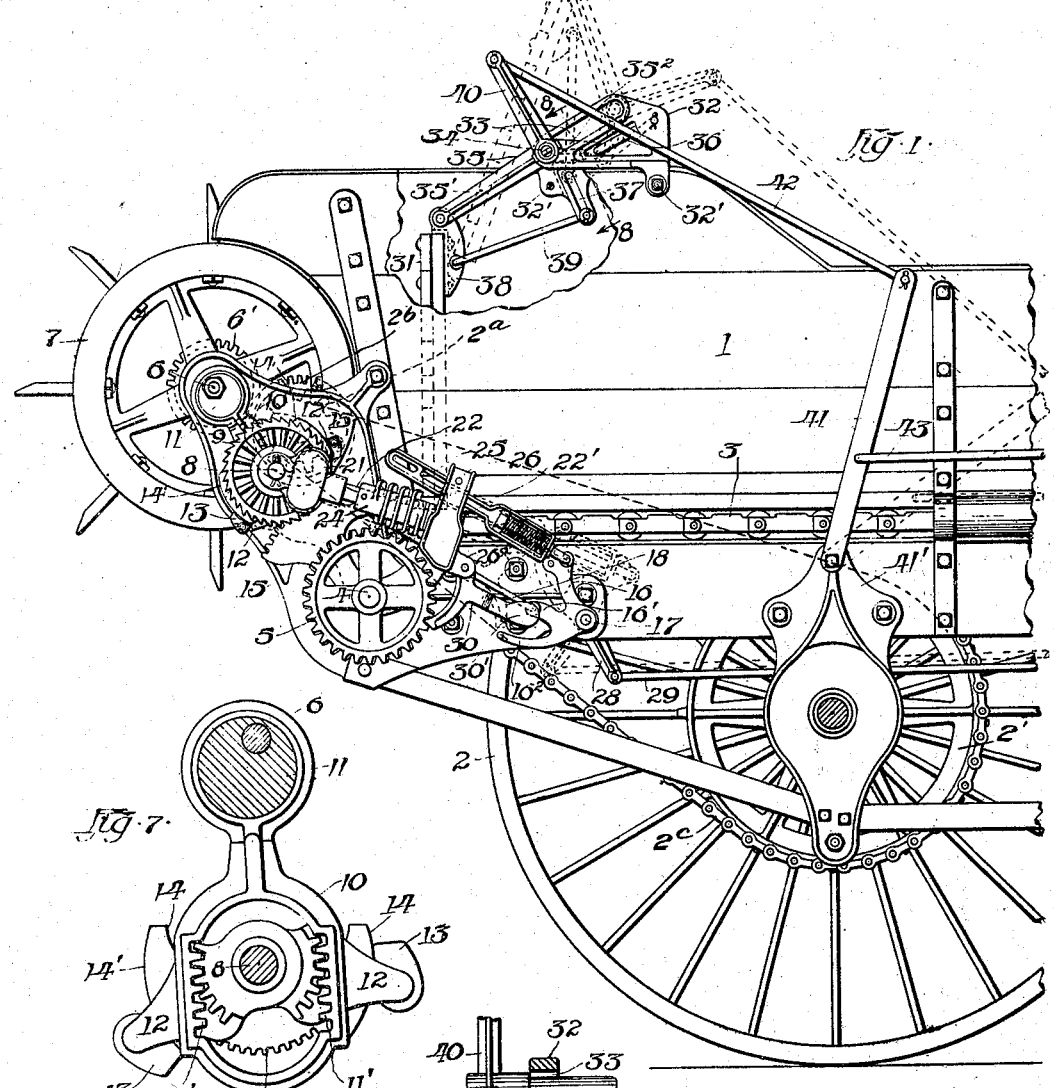

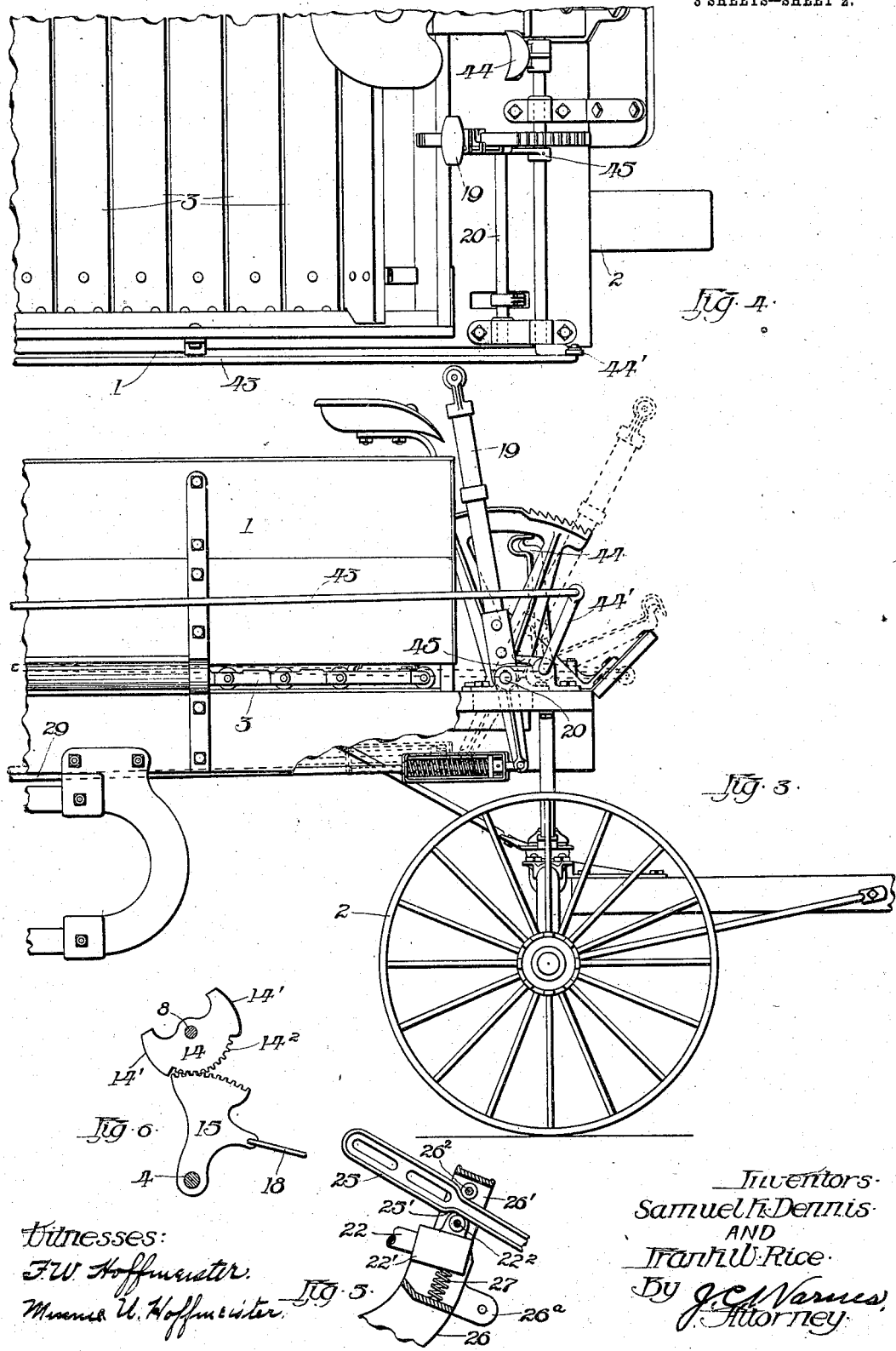

No. 867,019. PATENTED SEPT. 24, 1907.
S. K. DENNIS & F. W. RICE.
FERTILIZER DISTRIBUTER.
APPLICATION FILED MAR. 22, 1907.
3 SHEETS—SHEET 3.
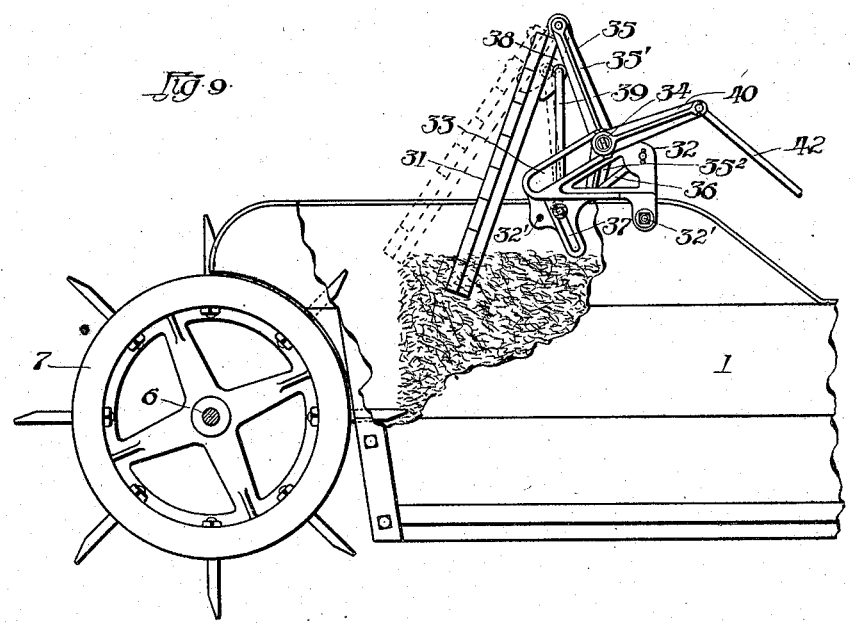

UNITED STATES PATENT OFFICE.

SAMUEL K. DENNIS AND FRANK W. RICE, OF CHICAGO, ILLINOIS, ASSIGNORS TO INTERNATIONAL HARVESTER COMPANY, A CORPORATION OF NEW JERSEY.

FERTILIZER-DISTRIBUTER.

No. 867,019.  Specification of Letters Patent.  Patented Sept. 24, 1907.

Application filed March 22, 1907. Serial No. 363,802.

*To all whom it may concern:*

Be it known that we, SAMUEL K. DENNIS and FRANK W. RICE, citizens of the United States, residing at Chicago, in the county of Cook and State of Illinois, have invented a new and useful Improvement in Fertilizer-Distributers, of which the following is a complete specification.

This invention relates to fertilizer distributers, but more particularly to the endgate and mountings for same, which are arranged in front of the distributing cylinder, and to the construction and control of the means for locking the apron against rearward movement when the apron driving mechanism is not in operation.

The object in view is to simplify and cheapen the construction of various parts and to produce an endgate which will be held rigidly when in its lower position against the pressure of the load, and when in its upper position will float and thereby operate as a rake upon the material being discharged.

Referring to the accompanying drawings—Figure 1 represents a right-hand side elevation of the rear end of a fertilizer distributer in which is embodied our invention, the right-hand wheel being removed to more clearly show the parts. Fig. 2 is a fragmentary plan view of the parts shown in Fig. 1. Fig. 3 is a right-hand side elevation of the front end of the machine shown in the preceding figures. Fig. 4 represents a partial plan of the parts shown in Fig. 3. Fig. 5 is a detail showing the construction of the casting in which is supported the forward or free end of the vibratory worm shaft. Fig. 6 is a detail of cam and sector which regulates the effective throw of the actuating pawls. Fig. 7 is a detail view designed to illustrate the manner in which movement is imparted to the pawl arms by the toothed eccentric link; Fig. 8 is a detail taken on the line 8—8 of Fig. 1, and Fig. 9 is a view showing in full lines the end-gate in its raised position with the movable fulcrum in its upward and forward position, and in dotted lines the same in its floating position.

In the drawings the box or body of the distributer or spreader is designated by the numeral 1, 2 the supporting wheels therefor, and 3 the usual movable apron mounted in the bottom thereof. The rear end of the apron 3 is supported upon and driven by the apron shaft 4, to the outer end of which is fixed the worm gear 5. At the rear end of the body is journaled the shaft 6, on which is mounted the toothed distributing cylinder 7. The distributing cylinder 7 is driven in the following manner: A sprocket wheel $2^1$ rotates with the axle of the supporting wheel 2. A gear wheel $6^1$ is secured to one end of the distributing cylinder shaft 6, and suitably journaled on the machine frame, adjacent thereto, is a sprocket wheel $2^a$, and fixed thereto is a pinion $2^b$, the latter meshing with and driving the pinion $6^1$ on the shaft 6. A sprocket chain $2^c$ engages the sprocket wheel $2^1$ and $2^a$, thereby imparting motion to the distributing cylinder 7 through the connection just described from the supporting wheel 2. The manner of driving the apron shaft 4 from the distributing cylinder shaft 6, through a pawl and ratchet mechanism operated by an eccentric rod, and the means for regulating the feed of the apron, are clearly illustrated and described in an application filed by us October 12, 1906, Serial No. 338,548, patented March 19, 1907, No. 847,323, Fertilizer distributer, and hence the present description of these parts will be brief. On the stub shaft 8 is journaled the combined ratchet and bevel gear 9, to which movement is imparted by the toothed eccentric link 10, this link being driven by means of the eccentric 11 on the cylinder shaft 6. The link 10 is bifurcated at its lower end, each arm thereof being provided with a toothed rack $11^1$, which meshes with the corresponding toothed segment $12^1$ on the pawl arms 12. These pawl arms (see Fig. 7) are pivotally mounted and oppositely disposed on the stub shaft 8, so that when a reciprocating motion is given the link 10 by the eccentric 11, it will impart a rocking movement to the pawl arms. On the pawl arms 12 are mounted the pawls 13, which are adapted to engage the ratchet portion of the gear and ratchet 9. To regulate the extent of effective movement of the pawls 13 on the ratchet gear 9 a cam lever 14 (see Figs. 6 and 7) is pivotally mounted on the stub shaft 8, this lever being provided with the cam surfaces $14^1$, each of which is adapted to engage the toe of one of the pawls 13 and prevent it from engaging the said ratchet gear 9 for a portion of the stroke of said pawl, the extent depending upon the position of the cam lever. The cam lever 14 is provided with a toothed segment $14^2$ which meshes with the gear segment 15, the latter being pivotally mounted on the apron shaft 4 and controlled by its connection with the arm $16^1$ of the angle lever 16, which is mounted on the rock shaft 17. The link 18 forms an operative connection between the arm $16^1$ of the angle lever 16 and the gear segment 15. Movement of the hand lever 19 on the forward end of the machine, which is mounted on the rock shaft 20, will thus control the position of the said cam lever and determine the effective throw of the pawls and hence regulate the speed of the rearward movement of the apron 3. For a more complete description of the principles involved in the foregoing construction and the operation of the apron feed and means for regulating the same, reference is also made to the application filed by applicants February 3, 1906, Serial No. 299,253 patented March 5, 1907, No. 846,188.

On the stub shaft 8 is also mounted the casting 21, which forms a journal bearing for the vibratory worm shaft 22 and a housing for the pinion 23 fixed thereto. The pinion 23 meshes with and is driven by the bevel gear portion of the gear and ratchet 9, and thus imparts movement to the worm 24, which, in turn, is adapted to engage and drive the worm gear 5 on the apron shaft 4. Movement of the vibratory worm shaft 22 on its pivotal center on the stub shaft 8 is effected by means of a bar 25. A fixed casting 26 (see Figs. 1 and 5) is provided with a yoke-like opening $26^1$, which engages a collar $22^1$ on the end of the worm shaft 22, and a roller $22^2$ is mounted in a bracket on said collar. The wider portion of the bar 25, above the shoulder $25^1$ thereon, engages the roller $22^2$ on the collar $22^1$, and the roller $26^2$ on the casting 26 forces the worm 24 into engagement with the worm gear 5; while the coil spring 27 operates to hold same normally out of engagement. The bar 25 is mounted at its lower end on the upwardly extending arm of the angle lever 16 on the rock shaft 17. A depending arm 28, secured to the inner end of the rock shaft 17, in connection with the rod 29, forms an operative connection between the rock shaft 17, on which is mounted the angle lever 16, and the hand lever 19 on the forward end of the machine. It will thus be seen that movement of this hand lever 19 will rock the angle lever 16, thereby producing endwise movement of the bar 25, and thus effect engagement and disengagement of the apron driving mechanism from the apron shaft. The interposed mechanism, including the eccentric link 10, the pawl arms 12, the pawls 13, the ratchet gear 9, the vibratory worm shaft 22, and other parts associated therewith, form collectively the mechanism for driving the apron rearwardly. The cam lever 14, and parts for operating same, constitute the mechanism for regulating the feed of the apron rearwardly, and it will be noted that both devices are operated by the same hand lever. These parts just described are all set forth in the applications to which reference has been made, and hence no novelty to these parts is claimed except the relation which they and the means for operating same bear to the pawl which prevents the rearward movement of the apron when the apron driving mechanism has been disengaged from the apron shaft 4. On a forwardly projecting lug $26^a$ on the fixed casting 26 is pivotally mounted the depending pawl 30, which is arranged to engage the worm wheel 5. This pawl may be held into engagement with the said worm wheel by a spring or other means, but preferably by the forwardly extending weight arm $30^1$, which thus makes it a gravity pawl, as the weight of this arm will operate to hold the pawl 30 into engagement with the worm wheel. To disengage this gravity pawl from the worm wheel an arm $16^2$ is formed integral with and extends rearwardly from the angle lever 16 on the rock shaft 17. This arm $16^2$ is adapted to engage the under side of the weight arm $30^1$ of the gravity pawl 30, lifting said arm and disengaging the pawl from the worm wheel whenever the arm $16^2$ is lifted. It will be observed that this arm $16^2$ is lifted or made to disengage the gravity pawl whenever the rock shaft 17 is made to move in a direction to engage the worm 24 with the worm wheel 5; that is, the gravity pawl will be thrown out of engagement when the worm 24 is thrown into engagement with the worm wheel, and the gravity pawl will be thrown into engagement when the said worm is thrown out. It will also be observed that this gravity pawl is controlled by the same angle lever 16 that controls the feed regulating mechanism and the apron driving mechanism, and that they are all controlled by a single hand lever 19.

In front of the distributing cylinder 7 is mounted a vertically movable endgate 31, this endgate and its mountings constituting one of the principal novel features of the invention. The mountings of this endgate and means for operating same will now be described. At the rear end of the body, and on each side thereof, is secured a bracket 32, this bracket being secured to the body by means of the bolts $32^1$. In each bracket is formed the slot 33, which extends upwardly and rearwardly from its rearward end. In these slots are mounted the rock shaft 34, which extends transversely of the body of the machine. The endgate supporting levers 35 (only that one on the right-hand side of the machine being shown) are fixed to said rock shaft near each end thereof, and on the inside of the bracket, these levers each comprising the long arm $35^1$, on the rear ends of which are pivotally hung the said endgate 31 and the short arms $35^2$. The short arms are connected to the bracket 32 by means of the link 36, the aggregate length of the said link and short arms being greater than the distance between the rock shaft 34, when in its rearward position, and the fixed end of the said link. The function of this link 36 and the short arm $35^2$ is to provide a movable fulcrum for the endgate as it is being raised. It will be seen from an inspection of Fig. 1 that as soon as the rock shaft 34 is rotated the link will draw the same toward the upper end of the slot 33, or from the full line position of Fig. 1 to the dotted line position of the same figure. A smaller slot 37 is formed at the forward end of the bracket 32, and on the inside thereof, and is arranged transversely with respect to the first mentioned slot 33. A hanger 38, which is fixed to the upper end of the endgate 31, forms the pivotal connection for the front end of the long arms $35^1$ and the upper end of the said endgate, and this same hanger also receives the rearward end of the controlling rod 39, the forward end of said rod engaging the slot 37. This hanger 38 and controlling rod, operate to hold the endgate 31 rigidly against the load when the said endgate is in its lower position; but after the endgate has been raised 3 or 4 inches the inclination of the rod 39 in the slot 37 will be sufficient to permit the bent end of the rod 39 to slide upwardly in the said slot and thus allow the lower end of the endgate to swing freely rearwardly; that is, it will be transformed from a rigid to a floating endgate, rigid in its lower position and floating in its upper position. The floating feature of the endgate makes it serve the well understood function of rakes in this connection. The slot 37 not only enables the endgate to float when in its raised position, but also permits the said endgate to be raised bodily on its movable fulcrum from the full line position of Fig. 1 to the dotted line position shown in the same figure. On the right-hand end of the rock shaft 34 is fixed the upwardly extending arm 40, which connects with the means for operating the said endgate. The parts just described may be regarded as the mountings for the endgate, and it will be seen that these mountings include a movable fulcrum, the fulcrum being formed by the rock shaft 34.

To operate the endgate a lever 41 is pivotally mounted on a fixed part of the spreader body, preferably on the frame casting 41¹, the upper end of this lever connecting through the rod 42 with the end of the arm 40 on the rock shaft 34. A rod 43 extends from a point intermediate of the length of the lever 41 forwardly to the front end of the machine, where it connects with the arm 44¹ of the foot lever 44. This foot lever is arranged within convenient reach of the operator, as is also the hand lever 19, and near the fulcrum point of the said lever 44, and movable with said foot lever, is the stop lug 45. In the full line position of the foot lever in Fig. 3 the stop lug 45 is shown in engagement with the hand lever 19. When the foot lever 44 occupies this position the endgate will be down in position to hold the rear end of the load away from the beater, the worm 24 on the vibratory worm shaft 22 will be out of engagement with the worm gear 5 and the gravity pawl 30 will be in engagement therewith, and the stop lug 45 will lock the hand lever 19 against forward movement. The foot lever therefore locks the hand lever against movement and the operative parts of the machine are held out of engagement until after the endgate has been raised. A depression of the foot lever will now raise the endgate, and in raising the endgate the shaft 34 will be slid upwardly and rearwardly in the slot 33 by means of the link 36. This upward and rearward movement of the fulcrum of the endgate mountings occurs simultaneously with the raising of the endgate as distinguished from a longitudinal movement of the endgate preceding the upward movement thereof. The upward movement of the fulcrum or rock shaft 34 not only enables the endgate to be raised with less relative movement of the levers controlling same, but will also elevate both the rock shaft and the endgate to a higher position and the fulcrum to a position in which it will not obstruct the rearwardly moving load. After the foot lever 44 has been depressed the hand lever may be moved forwardly by the operator, which will effect the engagement of the worm 24 with the worm wheel 5 and disengage the pawl 30 from said gear, as heretofore described.

We are aware that a construction in which the endgate controlling rod, with the other endgate supporting means, are arranged in the form of a parallelogram, is old. In such constructions as shown, for instance, in the patent which issued to Kinney April 1, 1902, No. 696,643, the endgate supporting means are located in the rear of the endgate, and the fulcrum for the supporting means are fixed, thereby rendering its vertical movement more limited, and the floating character of the endgate in its upper position is not secured.

What we claim as our invention, and desire to secure by Letters Patent, is:

1. In a fertilizer distributer, in combination, a body, a movable apron mounted in the bottom thereof, a distributing cylinder mounted on a shaft journaled in the rear end of said body, means for driving the distributing cylinder, an apron shaft on which the rear end of said apron is supported, a vertically movable endgate mounted in front of said distributing cylinder, a foot lever for controlling the position of said endgate, a driving mechanism interposed between the distributing cylinder shaft and the apron shaft, a device for regulating the speed of said driving connection, a pawl for locking the apron shaft against rearward movement, a single hand lever for engaging and disengaging said driving connection from the apron shaft, for controlling the speed regulating device and for disengaging the pawl, the said foot lever when holding the endgate in its lower or normal position being adapted to also lock the said hand lever against movement to engage said driving connection.

2. In a fertilizer distributer, in combination, a body, a movable apron mounted in the bottom thereof, a distributing cylinder located at the rear end of said body, a pivotally hung, vertically movable endgate arranged in front of said cylinder, mountings for said endgate, said mountings including a movable fulcrum and a link engaging at one end a transversely extending slot and at the other end connecting with the endgate below its pivotal bearings for holding same rigidly when in its lower position and for permitting same to float when in its raised position and for raising and lowering said endgate.

3. In a fertilizer distributer, in combination, a body, a movable apron mounted in the bottom thereof, a distributing cylinder located at the rear end of said body, a pivotally hung, vertically movable endgate arranged in front of said cylinder, mountings for said endgate, said mountings including a forwardly and upwardly movable rock shaft, an arm on said rock shaft, a link connecting said arm to a fixed point on the frame for effecting the sliding movement of the rock shaft, means for limiting the rearward swinging movement of the lower side of the endgate when in its lower position and for permitting it to swing freely to a limited extent when in its upper position, and a lever connection for raising and lowering said endgate.

4. In a fertilizer distributer, in combination, a body, a movable apron mounted in the bottom thereof, a distributing cylinder located at the rear end of said body, endgate mountings comprising side brackets, each provided with a forwardly and upwardly inclined slot and a lower slot transversely inclined with respect to the first mentioned slot, a rock shaft fulcrumed in the upwardly inclined slots, levers, each having a long and a short arm fixed to said rock shaft, an endgate pivotally hung on the rear ends of the long arms of said levers, links connecting the short arms to fixed points on the brackets, and links engaging at one end the said lower transversely inclined slots and at the other end engaging with the endgate, and a lever having operative connection with the rock shaft for raising and lowering said endgate.

SAMUEL K. DENNIS.
FRANK W. RICE.

Witnesses:
JAMES A. MOXEY,
CHARLES H. MANGOLD.